United States Patent
Reddy et al.

(10) Patent No.: US 7,448,367 B1
(45) Date of Patent: Nov. 11, 2008

(54) EVAPORATIVE EMISSION CONTROL IN BATTERY POWERED VEHICLE WITH GASOLINE ENGINE POWERED GENERATOR

(75) Inventors: Sam R. Reddy, West Bloomfield, MI (US); Timothy E. Mc Carthy, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/777,373

(22) Filed: Jul. 13, 2007

(51) Int. Cl.
*F02M 33/02* (2006.01)
*F02M 33/04* (2006.01)

(52) U.S. Cl. .................. 123/520; 123/519

(58) Field of Classification Search .......... 123/520, 123/519, 518, 516, 198 D, 521; 137/587–589, 137/43, 493
See application file for complete search history.

(56) References Cited

U.S. PATENT DOCUMENTS

| | | | |
|---|---|---|---|
| 5,263,462 A | 11/1993 | Reddy | |
| 5,437,257 A * | 8/1995 | Giacomazzi et al. | 123/520 |
| 6,321,727 B1 | 11/2001 | Reddy et al. | |
| 6,669,165 B2 * | 12/2003 | Burke | 251/102 |
| 6,769,415 B2 * | 8/2004 | Reddy et al. | 123/519 |
| 6,950,742 B2 * | 9/2005 | Yamaguchi et al. | 701/114 |
| 7,086,392 B2 | 8/2006 | Suzuki | |
| 7,137,288 B2 | 11/2006 | Kobayashi et al. | |
| 7,152,587 B2 | 12/2006 | Suzuki | |
| 2002/0096137 A1 * | 7/2002 | Kobayashi et al. | 123/179.4 |
| 2002/0162457 A1 * | 11/2002 | Hyodo et al. | 96/109 |
| 2002/0174857 A1 * | 11/2002 | Reddy et al. | 123/520 |
| 2006/0065253 A1 * | 3/2006 | Reddy | 123/520 |

OTHER PUBLICATIONS

Yojiro Iriyama et al., Design of a Fuel Vapor-containment System (FVS) . . . , SAE Technical Paper Series, Oct. 24-27, 2005, 2005-01-3825.

* cited by examiner

*Primary Examiner*—Mahmoud Gimie

(57) ABSTRACT

A plug-in hybrid vehicle is driven by one or more electric motors powered by a battery system with supplemental electric power provided by a gasoline engine powered generator. A canister, connected by a fuel vapor vent passage, is used to admit and temporarily adsorb fuel vapor from a vehicle fuel tank during refueling. The canister also has a first fuel vapor and air flow passage for venting the canister and introducing ambient air (in the reverse flow direction) for removing vapor stored in the canister during tank refueling. The canister has a second passage for conducting air and purged vapor from the canister to the operating engine. The first and second passages are opened only during engine operation for purging of stored fuel vapor. The first flow passage is selectively opened when the tank is being refueled. The sealed fuel system eliminates diurnal fuel tank vapor generation and canister bleed emissions.

9 Claims, 2 Drawing Sheets

EVAPORATIVE EMISSION CONTROL IN BATTERY POWERED VEHICLE WITH GASOLINE ENGINE POWERED GENERATOR

TECHNICAL FIELD

This invention pertains to the management of fuel tank gasoline vapor produced in operation of battery powered, electric motor driven automotive vehicles having a gasoline engine for generating supplemental electrical power on extended driving trips. The evaporative emission management process also enables periodic testing for fuel tank leaks and for assessment of the current Reid Vapor Pressure of on-board fuel.

BACKGROUND OF THE INVENTION

There is interest in producing passenger vehicles driven by an electric motor powered by a re-chargeable battery (for example, a lithium-ion battery). The operating range of the battery powered vehicle would be increased using an on-board electric generator driven, upon demand, by a gasoline engine. For relatively short driving excursions, the capacity of the battery would suffice and the gasoline engine would not be started. At the completion of such trips the battery would be recharged from a 110 volt AC source. Such a vehicle is sometimes called a plug-in hybrid vehicle.

Since many local driving trips could be completed within the electrical power capacity of the battery it is anticipated that many days could pass without starting the gasoline engine. But the engine would be necessary when longer trips are taken. By way of example, it is contemplated that battery-only trips (before plug-in recharging) may be of up to about forty miles. But the gasoline engine-driven electric generator would be used to increase the range of the vehicle to several hundred miles.

Despite its intermittent usage the plug-in hybrid gasoline engine will, of course, require on-board fuel storage. Gasoline stored in a vehicle fuel tank is exposed to ambient heating which increases the vapor pressure of the volatile hydrocarbon fuel. In conventional gasoline powered engines fuel tank vapor (typically comprising lower molecular weight hydrocarbons) is vented to a canister containing high surface area carbon granules for temporary adsorption of fuel tank emissions. Later, during engine operation ambient air is drawn through the carbon granule bed to purge adsorbed fuel from the surfaces of the carbon particles and carry the removed fuel into the air induction system of the vehicle engine. As stated, such plug-in hybrid vehicles operate mostly on batteries which are charged during the night by plugging into home AC outlets. A plug-in hybrid vehicle IC engine may not run for several days which results in no purging (cleaning) of the evaporative emission control canister. However, a conventional fuel tank will be generating diurnal vapors everyday. It would be desirable to use the familiar canisters but the mode of their operation must be altered to contain fuel vapor tending to flow from the fuel tank. This invention makes use of a familiar fuel evaporative emission control canister in a method of operation adapted for a plug-in hybrid type vehicle.

SUMMARY OF THE INVENTION

This invention provides a method of operating a fuel storage and delivery system for a plug-in hybrid type vehicle, The vehicle has a fuel storage and delivery system for operation of a gasoline engine that operates on demand for powering a generator for recharging a vehicle battery system and for providing supplemental electrical power for the electric motor or motors driving the wheels of the vehicle. In order to meet federal and state evaporative emission standards it is necessary to devise and operate a fuel storage and delivery system that releases little or no fuel from the vehicle at any time.

In accordance with one embodiment, a fuel tank is provided for a gasoline-fueled engine specified for on-demand powering of a generator for a plug-in hybrid vehicle. The tank has a filler pipe with a closure for refueling, a fuel pump and fuel line for delivery of fuel to the engine. The tank has sensors for detecting fuel level, fuel temperature and fuel tank pressure. And the tank has a fuel vapor vent line leading from the tank to the vapor inlet of an on-board refueling vapor recovery (ORVR) canister. The ORVR canister has an air inlet line for purging the canister of adsorbed fuel vapor during the periodic on-demand engine operation. The ORVR canister also has an outlet line for conduct of airborne fuel vapor drawn from the canister to the air intake system of the gasoline engine. Flow in each of the air inlet purge line and canister outlet purge line are controlled by suitable valves which may be electrical solenoid actuated valves. A computer control module (which may also be controlling other engine or vehicle functions) receives fuel level and fuel tank pressure input in controlling the operation of the control valves. The air inlet purge line may have a pressure/vacuum relief line and valve around the control valve in the air inlet line.

In a representative embodiment of the invention, the solenoid valves (or other suitable valves) in both control lines are closed except during fuel tank refueling and engine operation. Thus, the fuel tank and its ORVR canister are sealed shut with respect to venting of fuel vapor except for canister purging during engine operation and subsequent fuel tank venting and canister loading during refueling of the vehicle. Diurnal fuel temperature and pressure fluctuations are contained by the sealed system with some canister loading during fuel temperature and tank pressure increases and some canister unloading to the tank during fuel temperature and pressure decreases. The pressure/vacuum relief valve and line accommodates abnormal fluctuations in fuel tank pressure or vacuum. Thus, fuel vapor is contained within this sealed plug-in hybrid fuel system preventing canister fuel vapor bleed emissions.

In another embodiment of the invention, provision is made for periodic control module testing for leakage from the fuel system and for determining the Reid Vapor Pressure (RVP) value of the contained fuel for controlled engine operation. The sealed fuel tank system provides an opportunity to use fuel tank pressure increase/decrease for detecting fuel system leaks and for determining tank fuel RVP. Environmental Protection Agency (EPA) and California Air Resource Board (CARB) regulations require tank leak detection as a part of onboard diagnostics (OBD II). Tank fuel RVP determination is useful for engine cold start, driveability, and monitoring weathering of unused tank fuel. The vehicle computer control module has stored and incoming temperature and pressure data from sensors in the fuel tank and uses this data for periodic tests for leakage and RVP calculations.

Fuel vapor leakage from the fuel system is detected when a measured increase in fuel temperature fails to produce a corresponding increase in fuel tank pressure. Similarly RVP may be calculated using an algorithm stored in the control module.

These and other objects and advantages of the invention will be further understood following a more detailed description of preferred embodiments of the invention.

DESCRIPTION OF PREFERRED EMBODIMENTS

A plug-in hybrid automotive vehicle has a suitable rechargeable battery system that typically powers at least one electric motor for driving at least two wheels of the vehicle. As the vehicle operator drives the vehicle, a programmed computer is used to manage the operation of the electric motor and motive power delivered to the wheels in response to operator demand. While the battery system may be charged when the vehicle is not being driven, vehicle range even with a fully charged battery system is limited. In the subject hybrid electric motor-powered vehicle, an on-board gasoline powered engine is provided to power an electric generator to drive the electric motor when the battery reaches a low-charge condition. The focus of this invention and the following illustrations is on the fuel tank and evaporative emission control system for the plug-in hybrid vehicle gasoline engine.

Fuel evaporative emission control systems have been in use on gasoline engine driven automotive vehicles for many years. The gasoline fuel used in many internal combustion engines is quite volatile and usually formulated to provide suitable seasonal volatility. The fuel typically consists of a hydrocarbon mixture ranging from high volatility butane (C-4) to lower volatility C-8 to C-10 hydrocarbons. During daytime heating (i.e., diurnal heating), fuel temperature increases. The vapor pressure of the heated gasoline increases and fuel vapor will flow from any opening in the fuel tank. Normally, to prevent vapor loss into the atmosphere, the tank is vented through a conduit to a canister containing suitable fuel adsorbent material. High surface area activated carbon granules are widely used to temporarily adsorb the fuel vapor. This invention adapts such a fuel evaporative emission control system for use in a plug-in hybrid vehicle.

Figure 1:
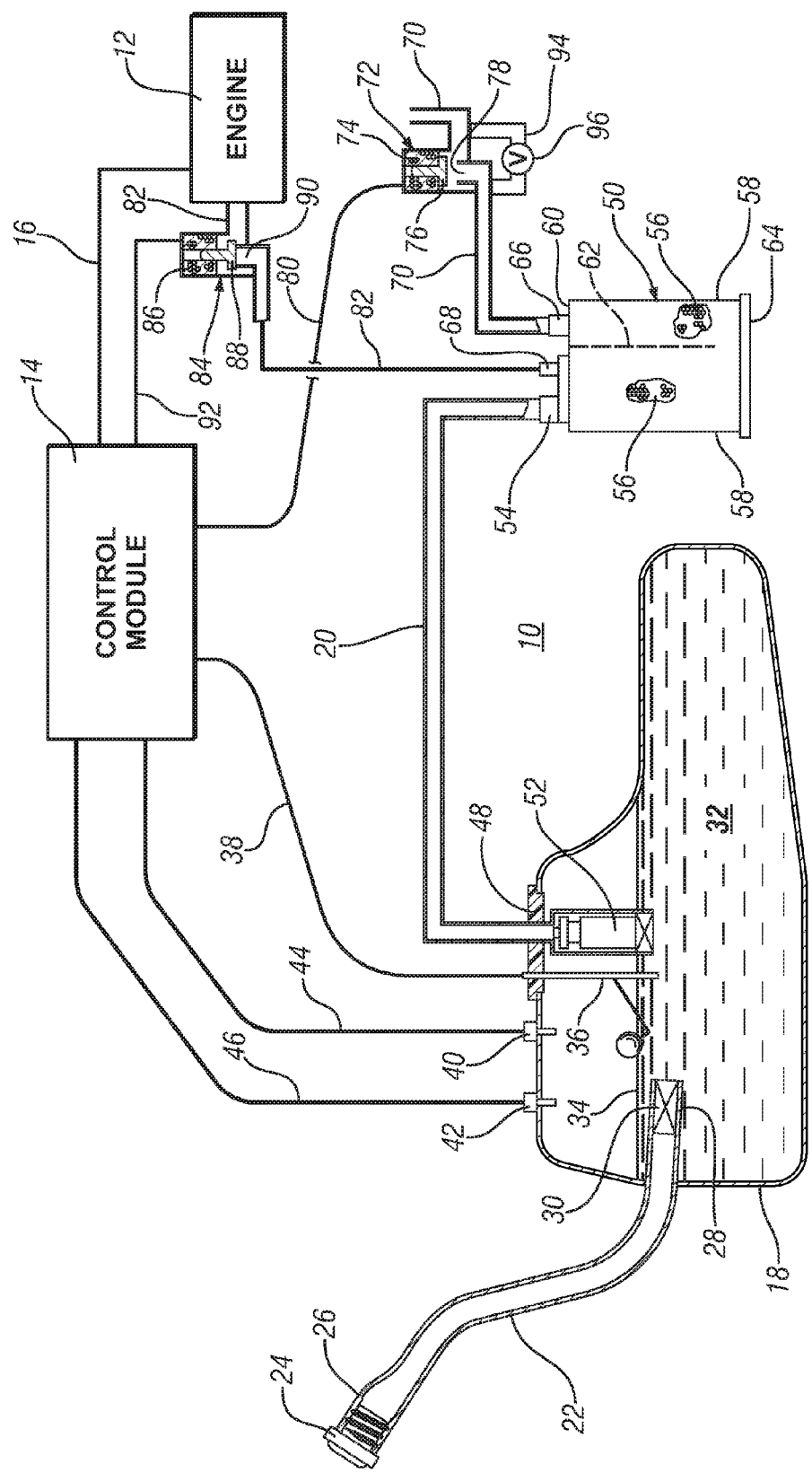
FIG. 1 is a schematic view, partly in cross section, of a vehicle fuel vapor control system for a plug-in hybrid vehicle. The system includes a fuel tank, fuel vapor line and a fuel vapor adsorbing canister with a purge line and solenoid-actuated valve and a vent line and solenoid-actuated valve.

An evaporative fuel emissions control system 10 for a plug-in hybrid automotive vehicle is illustrated in FIG. 1. The illustration is schematic and the components are not drawn to scale.

The system comprises a multi-cylinder gasoline-powered internal combustion engine, schematically indicated at block 12, specified for powering an on-board electric generator (not shown). The operation of a modern fuel efficient, low exhaust and evaporative emissions engine is controlled using a suitable programmed digital microprocessor or computer control module. Such a control module, indicated schematically at block 14, may be used in controlling engine operation and in controlling operation of the evaporative emission system. It may also be used in controlling operation of the battery system and electric motor drive.

When the gasoline engine is started, control module 14, which is powered by the vehicle battery (not shown), starts to receive signals from many sensors on the engine and emission control devices. Line 16 from the engine 12 to control module 14 schematically depicts the flow of such signals from the various sensors on the engine. During engine operation, gasoline is delivered from a fuel tank 18 by a fuel pump (not shown, but often located in the fuel tank) through a fuel line (not shown) to a fuel rail and fuel injectors that supply fuel to each cylinder of the engine or to ports that supply groups of cylinders. The timing of the operation of the fuel injectors and the amount of fuel injected per cylinder injection event is managed by control module 14. The subject emission control purge system is operated in harmony with engine operation to avoid upsetting the air-to-fuel ratio in the engine with a secondary flow of fuel-containing air.

Since gasoline and other fuels are quite volatile, fuel tank 18 is closed except for a vent line 20. Tank 18 is suitably made of steel of a suitable thickness to contain tank pressures experienced during diurnal heating. The tank 18 is provided with fill tube 22 with a gas cap 24 closing the gas fill end 26. The outlet end 28 of fill tube 22 is inside tank 18 and is often provided with a one-way valve 30 to prevent liquid fuel from splashing out the fill tube 22.

A volume of gasoline 32 is indicated with upper surface 34. A float-type fuel level indicator 36 provides a fuel level signal through line 38 to control module 14. Fuel tank pressure sensor 40 and temperature sensor 42 provide their respective data through signal transmitting lines 44 and 46, respectively, to control module 14. The sensors are used in this invention for diagnostic purposes. Sometimes both functions may be combined in a single sensor.

Fuel tank 18 is provided with a vent line 20 that leads through seal 48 from the top of the tank to a fuel vapor adsorption canister 50. In this system, canister 50 is a refueling vapor recovery (ORVR) canister because, as will be described, it is primarily employed to recover fuel tank vapor during vehicle refueling.

Float valve 52 within the tank 18 prevents liquid gasoline from entering vapor vent line 20. During refueling, fuel vapor mixed with air (often moisture containing air) flows under fuel tank pressure through vent line 20 to the vapor inlet 54 of canister 50. The vapor enters canister vapor inlet 54 and diffuses into granular adsorptive carbon material 56.

Canister 50 is typically molded of a suitable thermoplastic polymer such as nylon. In this embodiment, canister 50 comprises four side walls, defining an internal volume of rectangular cross section (two side walls 58 shown), with an integral top 60 and a vertical internal partition 62 that extends from top 60 and the front and rear sides. Canister 50 includes a bottom closure 64 that is attached to the side walls. As shown, partition 62 extends toward but short of the bottom closure 64. At the top of canister 50 is a vapor vent opening 66 that also serves as an inlet for the flow of air during the purging of adsorbed fuel vapor from the adsorbent material 56. Also formed in the top 60 of the canister 50 is a purge outlet 68 through which a stream of purge air carrying purged fuel vapor can exit the canister. It is seen that the construction of canister 50 extends the flow path of vapor from vapor inlet 54 to vapor vent 66 because of the partition 62 and closed bottom 64.

Connected to vent opening 66 is a vapor vent/air inlet line 70 and solenoid-actuated sealing valve 72. In accordance with this invention, sealing valve 72 is closed when the vehicle is operated solely under battery power and when the vehicle is not operated (parked). Sealing valve 72 is opened by solenoid activation when engine 12 is running under conditions suitable to receive fuel vapor purged from canister 50. Sealing valve 72 is also opened when the vehicle is being refueled by the addition of gasoline to fuel tank 18. In its closed position the stopper portion 76 of sealing valve 72 is biased closed to cover vent opening 78 in vapor vent/air inlet line 70. Upon actuation of battery-powered solenoid 74, stopper 76 is moved to uncover vent opening 78. Solenoid 74 is actuated upon command of control module 14 through signal lead 80. As stated, the vent valve 72 is usually only opened during vehicle refueling and during suitable modes of engine operation. However, a by-pass line 94 around vent opening 78 with a pressure/vacuum relief valve 96 may be used to protect fuel tank 18 from unexpectedly high pressure or vacuum when vent opening is closed by stopper 76. Tank protection relief valve 96 opens when, for example, the pressure in fuel tank 18 exceeds 3.5 psi or −2.0 psi (vacuum).

Canister purge outlet 68 is connected by purge line 82 through solenoid-actuated purge valve 84 to the engine 12. Purge valve 84 includes a battery-powered solenoid 86 and stopper 88 to close purge opening 90. Purge valve 84 is closed at engine-off and is opened only by command of control module 14 through signal lead 92 when the engine 12 is running and can accommodate the secondary stream of fuel-laden air stream drawn through canister 50.

As stated above, during suitable periods of engine-on operation, when the engine can accommodate purged fuel vapor in its air inlet, both vent valve 72 and purge valve 84 are open. Air enters vapor vent/air inlet line 70 and flows through the volume of carbon granules on both the right side and left side of partition 62 and exits through canister purge outlet 68. The flow of air carries hydrocarbon vapor removed from the surfaces of carbon granules 56 through purge line 82 to engine 12. Depending upon ambient conditions, fuel vapor may also be flowing from fuel tank 18 through vent line 20 and vent inlet 54 of canister 50. Since the vapor inlet 54 is spaced from purge outlet 68, the vapor can enter the canister but will be removed by the counter flow of air. Thus, during engine operation much of the fuel vapor temporarily stored in canister 50 during tank 18 refueling is removed to provide adsorption capacity for vapor generated during the next fuel tank refueling period.

When the plug-in hybrid vehicle is being refueled sealing valve 72 is opened to permit fuel vapor to flow from fuel tank 18 through vent line 20 to canister 50.

Thus, the canister's vapor vent/air inlet line 70 and purge line 82 are closed during many periods of vehicle soak. During such periods the pressure in fuel tank 18, vent line 20, canister, 50 etc. may increase substantially during diurnal heating, but no diurnal vapor is released from the tank. And the closure of valves 72, 84 prevents bleeding of fuel vapor from the canister if it had already contained substantial amount of fuel vapor. It is noted that fuel tank 18 can be sealed to prevent diurnal vapor generation by installing a solenoid actuated closing valve in vapor line 20 instead of using valve 72. However, such system will not prevent bleeding of fuel vapor emissions from canister 50.

During suitable periods of vehicle operation the control module 14 may run diagnostic tests of many systems of the vehicle. In accordance with an embodiment of this invention, control module 14 is programmed to test for leaks in fuel tank 18 and to determine RVP of fuel then in tank 18.

Plug-in vehicle fuel tank pressure may be monitored using an electronic pressure sensor (40 in FIG. 1). The tank temperature can be monitored using a thermister 42 or it can be estimated from the vehicle ambient temperature sensor. Knowing tank pressure change ΔP for known temperature change from T1 to T2, the fuel RVP can be predicted as described below.

Gasoline Tank Pressure Equations

By previous analysis, gasoline vapor pressure is found to be related to its temperature in accordance with the following equation which may be used in control module 14.

$$\ln P_g = \ln(A \cdot T \cdot RVP) - \frac{B}{T} \tag{1}$$

where $P_g$ is gasoline vapor pressure (psi) at temperature T (° K); A and B are constants 25.61, 2789.78, respectively; and RVP is Reid Vapor Pressure (psi).

Solving Equation (1) for P $$P_g = \text{EXP}\left[\ln(A \cdot T \cdot RVP) - \frac{B}{T}\right] \tag{2}$$

Simplifying Equation (2) results in $$P_g = A \cdot T \cdot RVP \cdot \text{EXP}\left[-\frac{B}{T}\right] \tag{3}$$

Equation (3) can be used to estimate gasoline vapor pressure increase $\Delta P_g$ for temperature increase from T1 to T2

$$\Delta P_g = P_g 2 - P_g 1 = A \cdot RVP\left[T2 \cdot \text{EXP}\left[-\frac{B}{T2}\right] - T1 \cdot \text{EXP}\left[-\frac{B}{T1}\right]\right] \tag{4}$$

The pressure increase measured in a sealed gasoline tank ΔP is due to gasoline vapor pressure increase $\Delta P_g$ and also due to thermal expansion of air in the headspace $\Delta P_t$:

$$\Delta P = \Delta P_g + \Delta P_t \tag{5}$$

An equation can be derived for $\Delta P_t$ by using ideal gas law for constant volume:

$$\frac{P_a 2}{T2} = \frac{P_a 1}{T1} \tag{6}$$

where $P_a 1$ and $P_a 2$ headspace air partial pressures corresponding to temperatures T1 and T2, respectively. Equation (6) can be written as:

$$\Delta P_t = P_a 2 - P_a 1 = \frac{P_a 1 T2}{T1} - P_a 1 \tag{7}$$

If the initial tank pressure is equal to atmospheric pressure $P_{atm}$, the initial partial pressure of air $P_a 1$ is equal to $P_{atm} - P_g 1$; therefore, Equation (7) can be written as:

$$\Delta P_t = \frac{(P_{atm} - P_g 1)T2}{T1} - (P_{atm} - P_g 1) \tag{8}$$

where $P_g 1$ is estimated by using Equation (3) as shown below and atmospheric pressure can be assumed to be 14.7 psi if actual value is not available.

$$P_g 1 = A \cdot T1 \cdot RVP \cdot \text{EXP}\left[-\frac{B}{T1}\right] \tag{9}$$

OBD II LEAK DETECTION AND TANK FUEL RVP ESTIMATION

Figure 2:
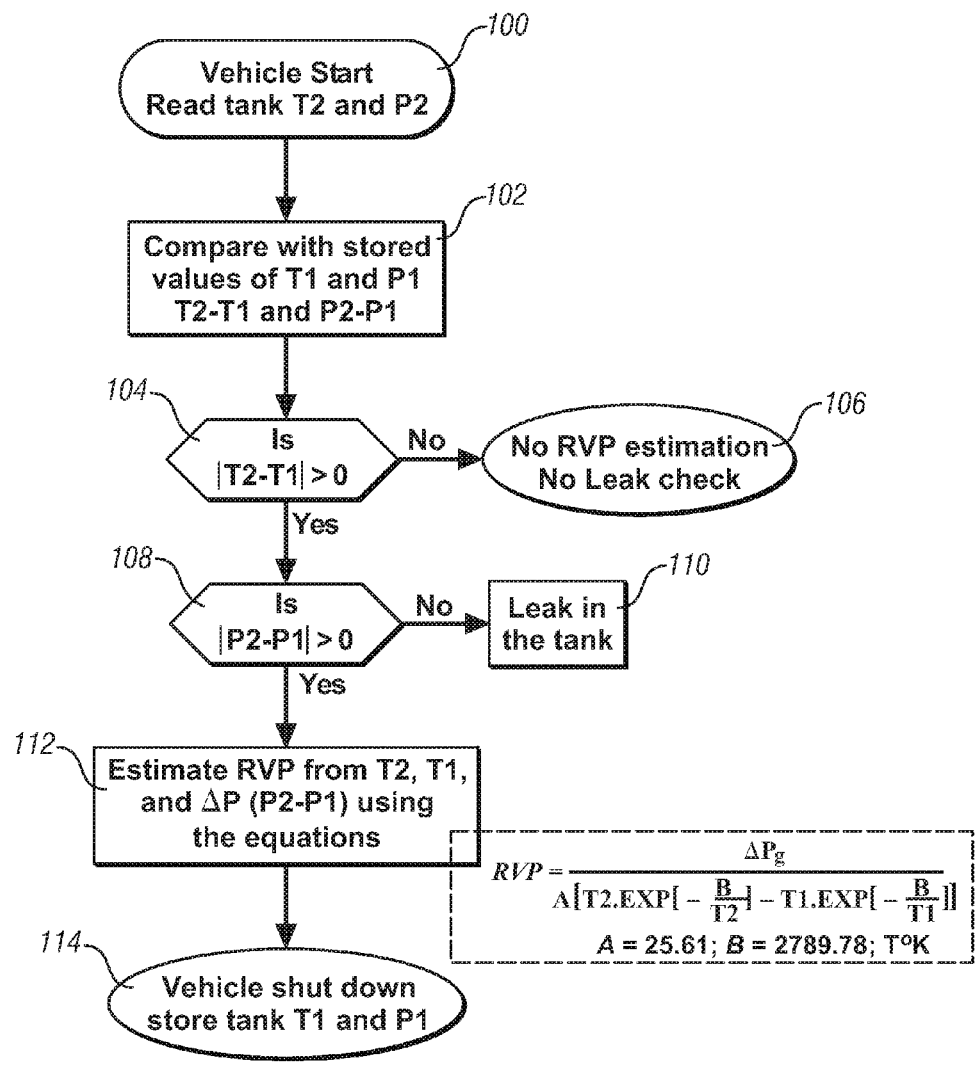
FIG. 2 is a flow chart of an algorithm performed in a vehicle computer control module for fuel tank leak detection and determination of the RVP of the current tank fuel composition.

Plug-in hybrid sealed fuel tank offers an opportunity to use the tank pressure increase/decrease for detecting tank leaks and tank fuel RVP. FIG. 2 is a flow chart showing how a vehicle control module 14 may be programmed to detect a fuel tank leak and to estimate tank fuel RVP by measuring tank temperatures and pressure/vacuum (e.g., sensors 42, 40). As stated, CARB and EPA regulations require tank leak detection as a part onboard diagnostics (OBD II) and tank fuel RVP (Reid Vapor Pressure) detection is useful for engine cold start, driveability, and monitoring weathering of unused tank fuel.

Knowing tank pressure change ΔP for known temperature change from T1 to T2, the fuel RVP can be predicted by using the following equations.

Equation (4) can be rewritten as:

$$RVP = \frac{\Delta P_g}{A\left[T2 \cdot \text{EXP}\left[-\frac{B}{T2}\right] - T1 \cdot \text{EXP}\left[-\frac{B}{T1}\right]\right]} \quad (10)$$

Equation (5) can be rewritten as:

$$\Delta P_g = \Delta P - \Delta P_t \quad (5a)$$

Where ΔP is measured and $\Delta P_t$ needs to be estimated using Equation (8); however, $P_g 1$ is not known. An iterative process has to be used, in first iteration, we have to assume P=0 and rewrite Equation (9):

$$\Delta P_t = \frac{P_{atm} T2}{T1} - P_{atm} \quad (8a)$$

In the second iteration, one uses the RVP estimated from the first iteration to estimate $P_g 1$ and then more accurate value of RVP. The iterative RVP estimation can be illustrated by an example as shown below.

Example: Gasoline fuel tank temperature increases from 74.2° F.(296.6° K.) to 92.0% (306.5° K.), which results in tank pressure of 2.52 psig.

Iteration 1:
  From Equation (8 a) $\Delta P_T$=(14.7*306.5/296.6)−14.7=0.49 psig
  From Equation (5 a) $\Delta P_G$=2.52−0.49=2.03 psig
  From Equation (10) RVP=8.12 psi Iteration 2:
  From Equation (9) $P_g 1$=5.07 psi
  From Equation (8) $\Delta P_T$=(14.7−5.07)*(306.5/296.6)−(14.7−5.07)=0.32 psig
  From Equation (5 a) $\Delta P_g$=2.52−0.32=2.20 psig
  From Equation (10) RVP=8.80 psi Iteration 3:
  From Equation (9) $P_g 1$=5.50 psi
  From Equation (8) $\Delta P_T$=(14.7−5.50)*(306.5/296.6)-(14.7−5.50)=0.31 psig
  From Equation (5 a) $\Delta P_g$=2.52−0.31=2.21 psig
  From Equation (10) RVP=8.84 psi The change in estimated RVP from Iteration 2 to Iteration 3 was insignificant (0.04 psi); therefore, there is no need to iterate any further. The estimated RVP is 8.84 psi which compares very well with the measured value of 9 psi. Note that the measured value of RVP is accurate with in ±0.2 psi. Therefore, the equation developed in this work can be used for predicting the plug-in hybrid tank fuel RVP from the tank pressure increase for known temperature increase.

FIG. 2 shows a flow chart which illustrates how the vehicle computer can check for the leaks in the tank (onboard diagnostics) and also predict tank fuel RVP. This leak detection system eliminates the need for additional hardware.

In FIG. 2, at step 100, a suitably programmed computer module 14 reads fuel tank temperature T2 and pressure P2 at engine startup. In step 102, values T2 and P2 are compared with previously stored temperature and pressure values T1 and P1. Values T1 and P1 are suitable values stored in the control module at the previous vehicle shut down.

The stored values are subtracted from currently read values, T2-T1 and P2-P1. Step 104 is a query step in which it is determined whether T2-T1 is greater than zero. If the answer to query 104 is "no" (step 106) conditions are not suitable for a leak check or a determination of RVP and the process is stopped until the next occasion of a vehicle start-up.

If the answer to query 104 is "yes", the control module determines whether P2-P1 is greater than zero (query step 108 in FIG. 2). If the answer is "no" (step 10) it is determined that there is a leak in the fuel tank, or its vent line, or the canister purge line. If the answer in query step 108 is "yes", no leak has been detected by this process and the process continues to step 112 in which the RVP of the current vehicle fuel is estimated. RVP is estimated using the equation and values for constants A and B set forth in FIG. 2 (and as illustrated above). After step 112, the process is completed except for storing new values of current fuel tank temperature (T1) and pressure (P1) when the vehicle is shut down.

If a RVP determination reveals that the value is too low due to fuel weathering, the vehicle control module can alert the operator for fuel change or implement forced use of the fuel before further weathering can occur and cause engine operational problems (poor cold start and driveability). If the predicted RVP is too high (winter fuel carried over to summer), the vehicle computer can alert the operator about excessive tank pressures and/or uncontrolled vapor emissions into the atmosphere by opening the tank pressure relief valve.

This invention provides a method of operating a fuel evaporative emission control system in a plug-in hybrid vehicle driven by a battery powered electric motor with a supplemental gasoline powered-electric generator operated on demand for supplemental electric power for the vehicle. The system is sealed when the engine is not operating and when the vehicle is not being refueled to minimize vapor generation in the fuel tank due to diurnal heating and to eliminate bleeding of fuel vapor from the canister system.

While embodiments of the invention have been illustrated, these illustrations are not intended to limit the scope of the invention.

The invention claimed is:

1. A method of operating a fuel evaporative emission control system in a plug-in hybrid vehicle driven by a battery powered electric motor with a supplemental gasoline engine powered-electric generator operated on-demand for supplemental electric power for the vehicle, where the vehicle comprises a gasoline fuel tank, a fuel vapor vent passage from the fuel tank to a fuel vapor adsorption canister, a first air and fuel vapor flow passage from the canister for venting the canister and for introduction of purge air to the canister to purge fuel vapor from the canister, and a second air and fuel vapor flow passage from the canister for passage of purge air and purged fuel vapor from the canister to an air induction system of the engine, the method comprising:

opening the first and second air and fuel vapor passages during engine operation;

opening the first air and fuel vapor passage, but not the second air and fuel flow passage, when the vehicle is not operating and the gasoline is being added to the fuel tank; and closing both of the first and second air and fuel vapor passages for preventing diurnal vapor generation and preventing bleeding of fuel vapor from the canister when the vehicle is not in operation and when the vehicle is in operation but the gasoline engine is not being operated.

2. A method of operating a fuel evaporative emission control system as recited in claim 1 in which the opening and the closure of the first and second air and fuel vapor passages is controlled by signal of a computer control module.

3. A method of operating a fuel evaporative emission control system as recited in claim 1 in which the opening and closure of the first and second air and fuel vapor passages is performed by an electric solenoid valve in each passage.

4. A method of operating a fuel evaporative emission control system as recited in claim 1 in which the passage of air and vapor in the first and second air and fuel vapor flow passages is controlled by an electric solenoid valve in each passage and the respective solenoid valves are operated by signal of a computer control module.

5. A method of operating a fuel evaporative emission control system as recited in claim 1 in which the vehicle comprises a computer control module for operation of the evaporative emission control system and the control module acquires temperature and pressure data of the fuel in the fuel tank at predetermined times during vehicle operation.

6. A method of operating a fuel evaporative emission control system as recited in claim 5 in which the control module compares fuel temperatures and fuel tank pressures taken at a first time and at a second later time to determine whether there is a fuel vapor leak from the fuel tank or canister.

7. A method of operating a fuel evaporative emission control system as recited in claim 6 in which in which the first time is at an occasion of vehicle shut down and the second time is the next occasion of vehicle start.

8. A method of operating a fuel evaporative emission control system as recited in claim 5 in which the control module compares fuel temperatures and fuel pressures taken at a first time and at a second later time to determine the Reid Vapor Pressure of the fuel then in the fuel tank.

9. A method of operating a fuel evaporative emission control system as recited in claim 6 in which a measured increase in temperature without a corresponding measured increase in pressure signals a fuel vapor leak from the fuel tank or canister.

* * * * *